United States Patent [19]

Stokes

[11] Patent Number: 4,982,856
[45] Date of Patent: Jan. 8, 1991

[54] HIGH TEMPERATURE, HIGH PRESSURE CONTINUOUS RANDOM GLASS FIBER REINFORCED THERMOPLASTIC FLUID VESSEL AND METHOD OF MAKING

[75] Inventor: Vijay K. Stokes, Schenectady, N.Y.

[73] Assignee: General Electric Company, Schenectady, N.Y.

[21] Appl. No.: 370,678

[22] Filed: Jun. 23, 1989

[51] Int. Cl.$^5$ .............................................. B65D 1/16
[52] U.S. Cl. ........................................ 220/3; 220/414
[58] Field of Search ..................... 220/3, 414, 83, 71, 220/73

[56] References Cited

U.S. PATENT DOCUMENTS

| | | |
|---|---|---|
| 2,108,076 | 2/1938 | Prickett . |
| 2,681,142 | 6/1954 | Cohen . |
| 3,765,557 | 10/1973 | Giwer .................................. 220/3 |
| 3,969,872 | 7/1976 | Beck ..................................... 220/3 |
| 4,036,390 | 7/1977 | Morse . |
| 4,053,081 | 10/1977 | Minke .................................. 220/3 |
| 4,073,513 | 2/1978 | Blakeley . |
| 4,302,035 | 11/1981 | Ochwat . |
| 4,504,530 | 3/1985 | Bliley . |
| 4,548,465 | 10/1985 | White . |
| 4,621,841 | 11/1986 | Wakefield . |
| 4,676,533 | 6/1987 | Gerondale . |
| 4,699,288 | 10/1987 | Mohan . |
| 4,741,456 | 5/1988 | Laudou et al. ........................ 220/3 |
| 4,753,368 | 6/1988 | Lescaut . |
| 4,778,073 | 10/1988 | Ehs ....................................... 220/3 |

Primary Examiner—Joseph Man-Fu Moy
Attorney, Agent, or Firm—Marilyn E. Glaubensklee; James C. Davis, Jr.; Paul R. Webb, II

[57] ABSTRACT

A hot water tank typically at 180° F. and 55 psi operating temperature and pressure, respectively, comprises heat welded segments of compression formed AZDEL material, a polypropylene resin reinforced with a randomly oriented continuous filament glass fiber mat which comprises about 40% of the weight of the resinuous material. Thermoplastic fittings are used to coupled water conduits to the tank.

19 Claims, 6 Drawing Sheets

HIGH TEMPERATURE, HIGH PRESSURE CONTINUOUS RANDOM GLASS FIBER REINFORCED THERMOPLASTIC FLUID VESSEL AND METHOD OF MAKING

This invention relates to high temperature, high pressure thermoplastic hot water tanks.

Generally, hot water heater tanks are typically made of steel. To preclude corrosion, the inner surfaces of such tanks are lined with other materials such as porcelain which can chip and therefore affect the useful life of the tank. Other structures include an inner blow molded thermoplastic tank that does not corrode. However, such inner thermoplastic tank liners as stand-alone structures are not normally capable of withstanding the pressures of typical hot water systems in the region of, for example, 180° F. To provide the necessary structural support, the inner thermoplastic liner is encapsulated within a continuous glass fiber wound thermoset matrix composite outer shell. These are sometimes referred to as unidirectional fiber reinforced materials. Each inner liner has to be wound and resin impregnated individually. Moreover, the mounts for plumbing fixtures to couple hot water to and from such tanks are relatively complex, and are typically attached in a labor intensive procedure. Consequently, such tanks are relatively costly. Further, thermosetting materials need to be molded and once set, can not be welded, and therefore, the joints require special sealing devices.

In U. S. Pat. 4,699,288, a high pressure vessel includes a plurality of layers of resin impregnated graphite fibers and a plurality of layers of hybrid resin impregnated glass and polymer fibers with the glass and polymer fiber layers alternating with the graphite fiber layers. The outermost layers are hoop wound and the innermost layers are helically wound. A layer of elastomer material is joined to the interior surface of the innermost layer of fibers, and a layer of stiff composite material is joined to the interior surface of the elastomer layer. This multilayered structure is relatively costly to fabricate and includes thermosetting materials which are required to be molded in place and therefore cannot take advantage of compression molding procedures normally employed in thermoplastic operations. Also, the fibers need to be wound as disclosed which is relatively costly. This structure, therefore, suffers from the drawback in that it is not believed economically practical for typical consumer hot water tanks.

A lined pressure vessel is disclosed in U. S. Pat. No. 4,504,530. A fiber reinforced resin article has a resin rich interior coating. However, the structure is formed with a thermosetting resin which is injected into a mold and the pressure of an inflatable core is increased to compress the lay-up of various layers forming the structure. Thus a mold is required and the resulting structure is also not believed commercially practical for consumer applications.

The present inventor recognizes a need for a low cost vessel for receiving fluid such as water at elevated temperatures and pressures as discussed above for use in consumer type hot water tanks. Thermoplastics have the advantage of being relatively low cost and when formed by representative compression forming techniques are relatively inexpensive in fabrication. The disadvantage of thermoplastics is that generally they exhibit creep, that is, strain and stretch in the presence of elevated temperatures and pressures. Further, thermoplastics are not generally known to withstand the pressures and temperatures present in a typical hot water heater systems. A requirement for such a heater system further is not only to withstand the relatively high pressure and high temperature of the fluids to be contained by the vessel, but also it is desirable that the vessel have relatively high impact resistance. Some glass fiber reinforced thermoplastic materials comprising chopped fibers tend to have high strength, high temperature characteristics but have low impact resistance and tend to fracture easily i the presence of large impact forces Instability to impact resistance is undesirable for such high pressure, high temperature vessels There presently are known relatively high temperature thermoplastic materials known as engineering thermoplastics. However, these thermoplastic materials are not generally known to withstand the high temperatures and pressures of a hot water pressurized vessel for consumer applications without significant undesirable creep.

The present inventor has discovered that one particular material commercially available under the trademark ADZEL, a trademark of ADZEL Inc., comprising a polypropylene resin impregnated randomly oriented continuous filament glass fiber mat has relatively high strength, high impact resistance, and high temperature resistance characteristics and relatively low strain at elevated temperatures and pressures required for a fluid vessel. This material, being thermoplastic, advantageously may be heated to its softening temperature above its glass transition temperature $T_g$ at which the material in sheet form as presently manufactured can be compression molded to form a high temperature, high pressure vessel.

A high pressure, high temperature fluid vessel in accordance with the present invention, for example, may comprise a plurality of sheets of thermoplastic members shaped to form a hollow fluid vessel, each member comprising a thermoplastic resin impregnated continuous filament randomly oriented glass fiber mat. The members are secured together at at least one joint. Means are provided for sealing the at least one joint. By way of example, the sealing means may include a thermoplastic weld in which the materials are vibration welded to form a hermetic seal or may be sealed by gaskets or adhesive material and fastening means.

Figure 1A:
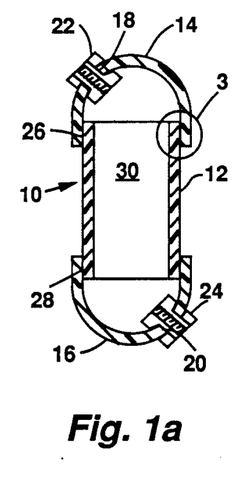
FIGS. 1a, 1b, 1c, 1d, and 1e are different embodiments of a high pressure, high temperature fluid vessel constructed in accordance with present invention.

In FIG. 1a, a hot water tank 10 is adapted to receive water at a pressure of up to a maximum of 300 psi with an operating pressure of about 55 psi and an operating temperature of about 180° F. Tank 10 comprises a circular cylindrical tubular member 12 and two similar semispherical end caps 14 and 16. End caps 14 and 16 may be identical in shape but may include different fitting apertures, for example, aperture 18 in cap 14 and aperture 20 in cap 16. Also, member 12 may have one or more fitting apertures (not shown). Thermoplastic fitting 22 is secured to end cap 14 in aperture 18. A thermoplastic fitting 24 is secured to end cap 16 in aperture 20. Fittings 22 and 24 may be of molded thermoplastic material. In the embodiment of FIG. 1a, apertures 18 and 20 are identical in size and located in identically shaped surfaces of the respective caps 14 and 16. In this case, the fittings 22 and 24 may be identical. End cap 14 is secured to the member 12 at a lap joint 26. Member 12 is secured to the end cap 16 in lap joint 28. Joints 26 and 28, when the interior volume 30 of the tank 10 is pressurized, are in shear.

Figure 5A:
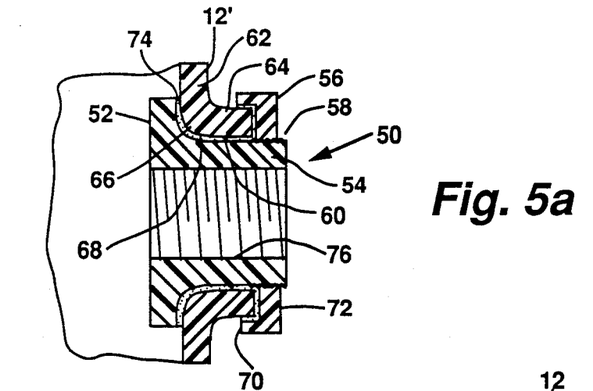
FIGS. 5a, 5b, and 5c are different embodiments of a thermoplastic fluid coupling fitting adapted to couple the fluid vessels of the embodiments of FIGS. 1a-1e to a pressurized, high temperature fluid.
Figure 5B:
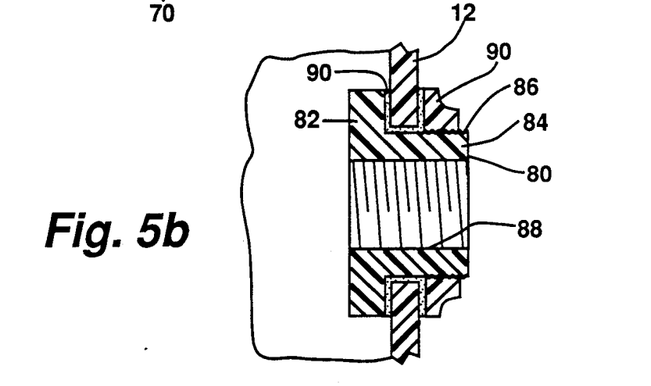
Figure 5C:
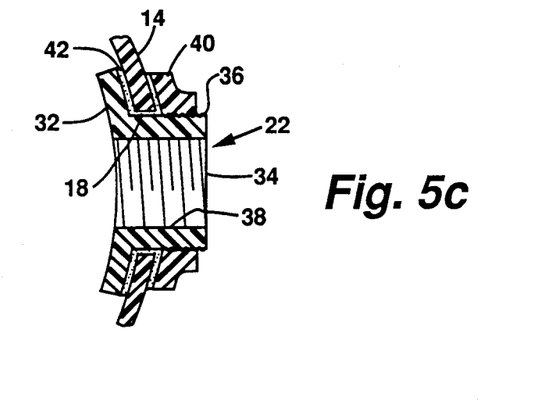

A representative fitting 22 is shown in FIG. 5c. In FIG. 5c, fitting 22 comprises a thermoplastic annular flange 32 and a thermoplastic boss 34. Flange 32 and boss 34 are integral concentric circular cylindrical members. Boss 34 has external threads 36 and internal threads 38. A thermoplastic nut 40 is threaded to threads 36 of fitting 22 for clamping the fitting 22 to the end cap 14 via &]le flange 32. The fitting 22 and nut 40 may be fabricated from molded thermoplastic materials preferably high strength, high temperature so called engineering materials sold under the trademark VALOX, a polybutylene terephthalate, XENOY, a blend of polycarbonate and polybutylene terephthalate, LEXAN, a polycarbonate material, or NORYL, a mixture of high impact polystyrene and polyphenylene oxide. Xenoy, Lexan, Noryl, and Valox are registered trademarks of the General Electric Company.

The flange 32 has a surface curvature which mates with the curvature of the semispherical surface of the end cap 14 to provide a close fit therewith. A high temperature resistant, high pressure resistant adhesive layer 42 is between the flange 32, boss 34, nut 40 and the end cap 14. In the alternative, a compliant gasket may be used in place of the adhesive or in an additional alternative, the flange 32 and boss 34 may be heat welded to cap 14, such as, for example, by spin welding.

The threads 38 couple externally threaded fluid conduits (not shown) for carrying pressurized, high temperature fluid to and from the interior volume 30 of the tank 10, FIG. 1a. The flange 32 of the fitting 22 distributes the stresses over a relatively broad footprint of the end cap 14 for spreading the stresses induced by the relatively high pressure of the interior volume 30 of the tank 10.

Should it be desired to place a fitting in the side wall of the circular, cylindrical member 12 of the tank 10, then the thermoplastic fittings illustrated in FIGS. 5a and 5b may be employed. In FIG. 5a, fitting 50 comprises a curved circular disc flange 52 and a circular cylindrical boss 54. The flange 52 and boss 54 are made of thermoplastic material similar to the material of fitting 22, FIG. 5c. A thermoplastic nut 56 is threaded to external threads 58 on projection 54. The member 12', corresponding to member 12, FIG. 1, tank 10, has a cylindrical opening 60 through which the boss 54 extends and mates. The wall 62 of member 12' is formed into an upstanding circular cylindrical rib 64 with a somewhat smooth rounded corner 66 at the interface of the wall 62 and rib 64. The rib 64 serves to strengthen the edge 68 of the aperture 60 formed in wall 62. The rib 64 and corner 66 are formed by heating the member 12' to above its glass transition temperature and compression forming the rib 64 and corner 66 to the configuration shown simultaneously with the forming of member 12 to be described later. The rib 64 extends completely around the periphery of the edge 68.

The nut 56 includes a annular rib 70 which extends over and closely engages the outer surface of the upstanding rib 64. Rib 70 extends from a washer-like disc portion 72 of the nut 56. The portion of the boss 54 mating with the rib 64 is not threaded. The interface between the nut 56 and rib 64 may be bonded with an adhesive 74. In the alternative, a compliant gasket may be employed. In a still different alternative embodiment, the fitting 50 may be heat welded to the member 12' to form a mechanical and fluid tight seal bond therebetween. The fitting 50 includes internal threads 76 for receiving conduits (not shown) threaded on a external surface. The conduits provide fluid engagement with the tank 10 permitting fluid to flow to and from the interior volume 30 of the tank. The nut 56 may also be sealingly engaged with the rib 64 by an adhesive material or gasket.

In FIG. 5b, fitting 80 includes a circular cylindrical curved disc-like flange 82 whose curvature mates with the curvature of member 12 and an upstanding circular cylindrical tubular boss 84 having external threads 86 and internal threads 88. The flange 82 has a curvature matching the curvature of the wall of member 12 and closely engages that wall. The fitting elements are sealed with an adhesive material 90 at the interface between the fitting elements and the member 12. In the alternative, the fitting may be heat welded to the member 12 to form a sealing and mechanical bond to the member 12. The nut 90 may be a circular disc-like member which is engaged with the threads 86 for locking the fitting to the member 12 via the flange 82. The nut may be used with a heated weld joint of the fitting 80 to the member 12. The internal threads 88 mate with the external threads of a conduit (not shown) for coupling high temperature, high pressure fluids to the internal volume of the tank.

The member 12, FIG. 1, and end caps 14 and 16 of lank 10 are formed from a high temperature, high pressure thermoplastic polypropylene resin reinforced random continuous filament glass fiber mat. This material is available in sheet form commercially known as ADZEL. This material has a unique advantage for applications in a high pressure, high temperature vessel. The material, being thermoplastic, can be compression formed relatively inexpensively. The random mat continuous filament fiberglass structure of the material incorporated in the present invention is readily adaptable to compression molding. The sheet material is deep drawn to form, for example, the end caps 14 and 16 in FIG. 1a. During compression molding, the fibers within the material tend to be pulled through the heated viscous thermoplastic resin. Should unidirectional fiber reinforced resins be used, the fibers, because they are glass and inelastic, need to be pulled through the viscous material during the forming. For example, as the end caps 14 and 16 are molded the material bends and stretches somewhat, This action causes the fibers to be pulled through the viscous molten plastic material. Such pulling action tends to require excessive forming forces. When forming relatively large parts, such as the water heater elements of FIG. 1a, which may be, for example a 52 gallon capacity vessel, the forming of thermoplastic reinforced resins with unidirectional glass fibers becomes difficult. Also, if the fibers were unidirectional, they may tend to pull in non-parallel directions and cause significant deterioration in the material integrity.

Figure 1B:
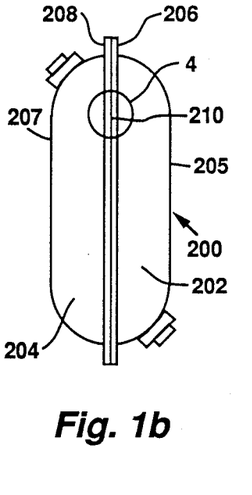
Figure 1C:
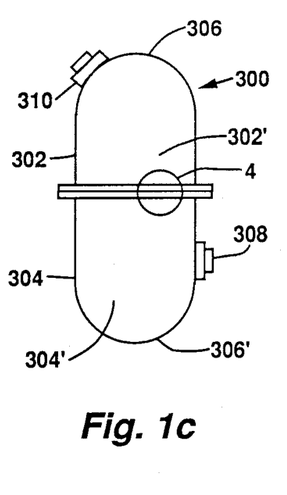
Figure 1D:
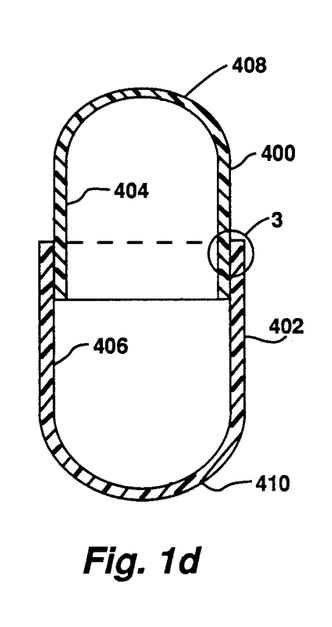
Figure 1E:
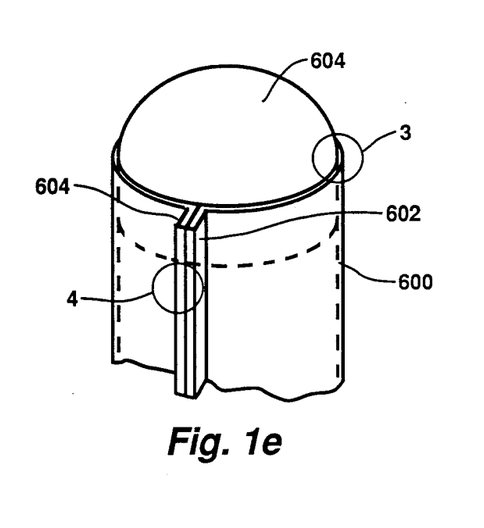
Figure 2A:
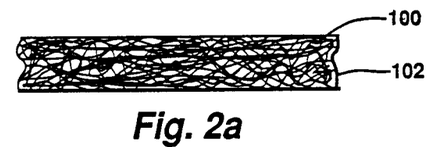
FIGS. 2a and 2b are respective sectional and plan views of a thermoplastic resin impregnated continuous filament randomly oriented glass fiber mat material.
Figure 2B:
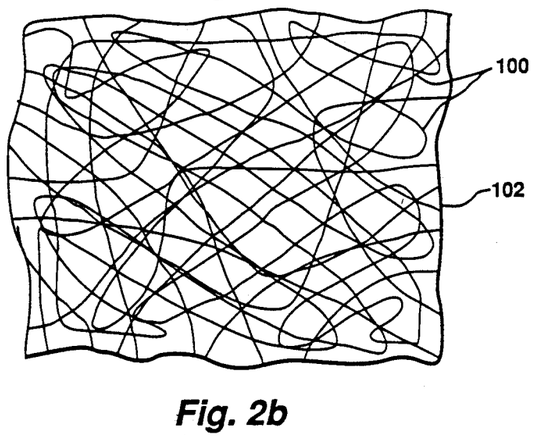

The random fibers of the material of the present invention is shown in FIGS. 2a and 2b. The fiber mat 100 of the sheet 102 of polypropylene reinforced resin employed in the embodiment of FIG. 1 has a large plurality of fibers, but the fibers are randomly coiled and curved. In plan view, FIG. 2b, it is seen that the fibers 100 extend in random directions and are generally coiled relative to any given point in the material. When the material 102 is compression molded into a formed shape such as the concave caps 14 and 16 of FIG. 1a, the inelastic glass fibers during the forming process are pulled due to the stretching of the material as it is deformed. However, the fibers, due to their coiled arrangement, tend to unwind and uncoil as they are pulled during the forming process. This uncoiling presents a minimum stress on the forming apparatus as the fibers need not be pulled through a large length of material as occurs with unidirectional fibers. That is, the unwinding action minimizes pulling forces on the fibers.

When the polypropylene thermoplastic resin forming the thermoplastic matrix for the sheet material, from which the vessel of the present invention is formed, is heated above its glass transition temperature, the material is relatively viscous. For example, the viscosity may be several thousand poise. This high viscosity causes relatively high resistance forces to the pulling of the fibers therethrough during the forming process. Consequently, compression forming this material is more practical as compared to compression forming unidirectional fiber reinforced materials. The random fiber mat arrangement is essential for the present invention in that the high temperature, high pressure of the vessel require minimum creep, high tensile load, high modulus of elasticity, and relatively high impact strength.

Figure 6:
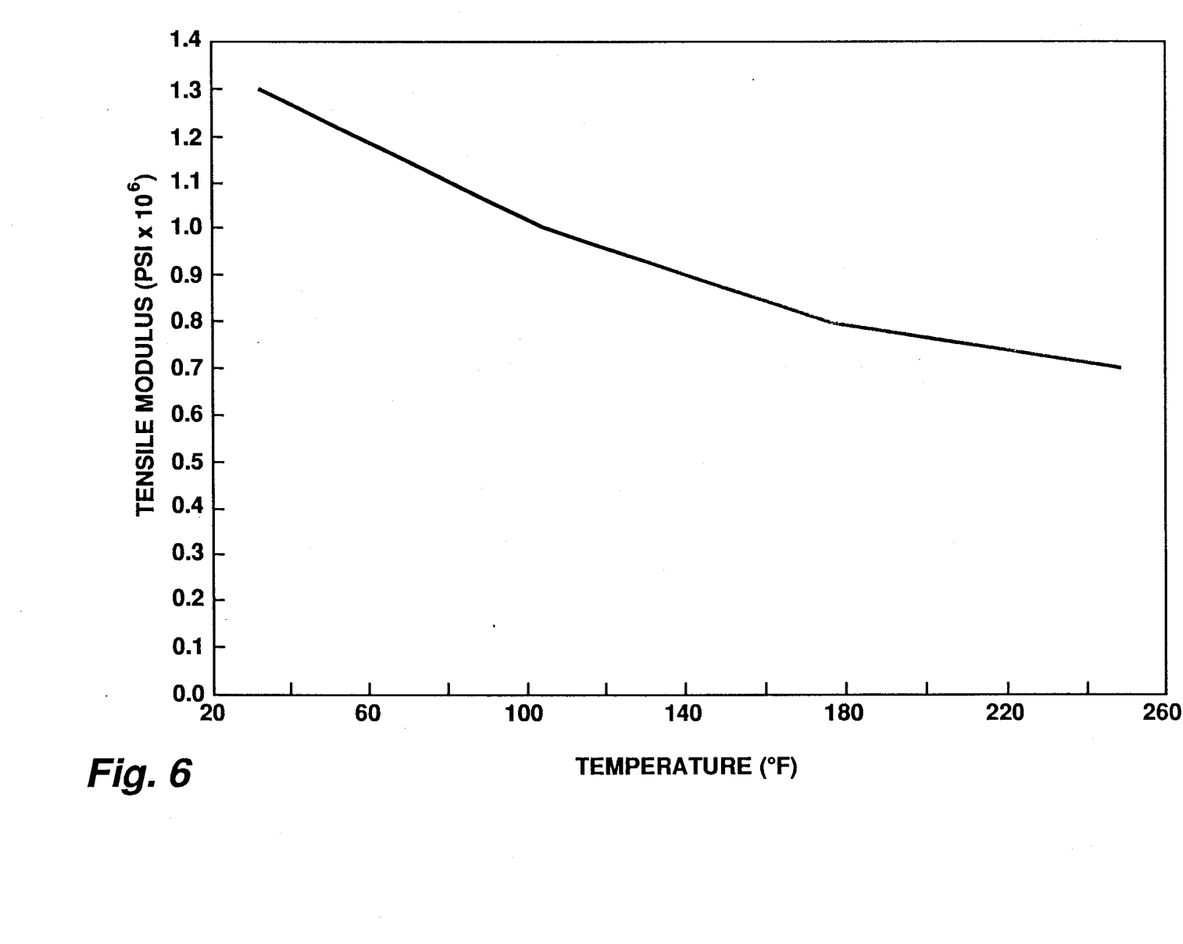
FIGS. 6, 7, and 8 are graphs representing different properties of a thermoplastic resin impregnated continuous filament glass fiber mat structure employed in the embodiments of the present invention.
Figure 7:
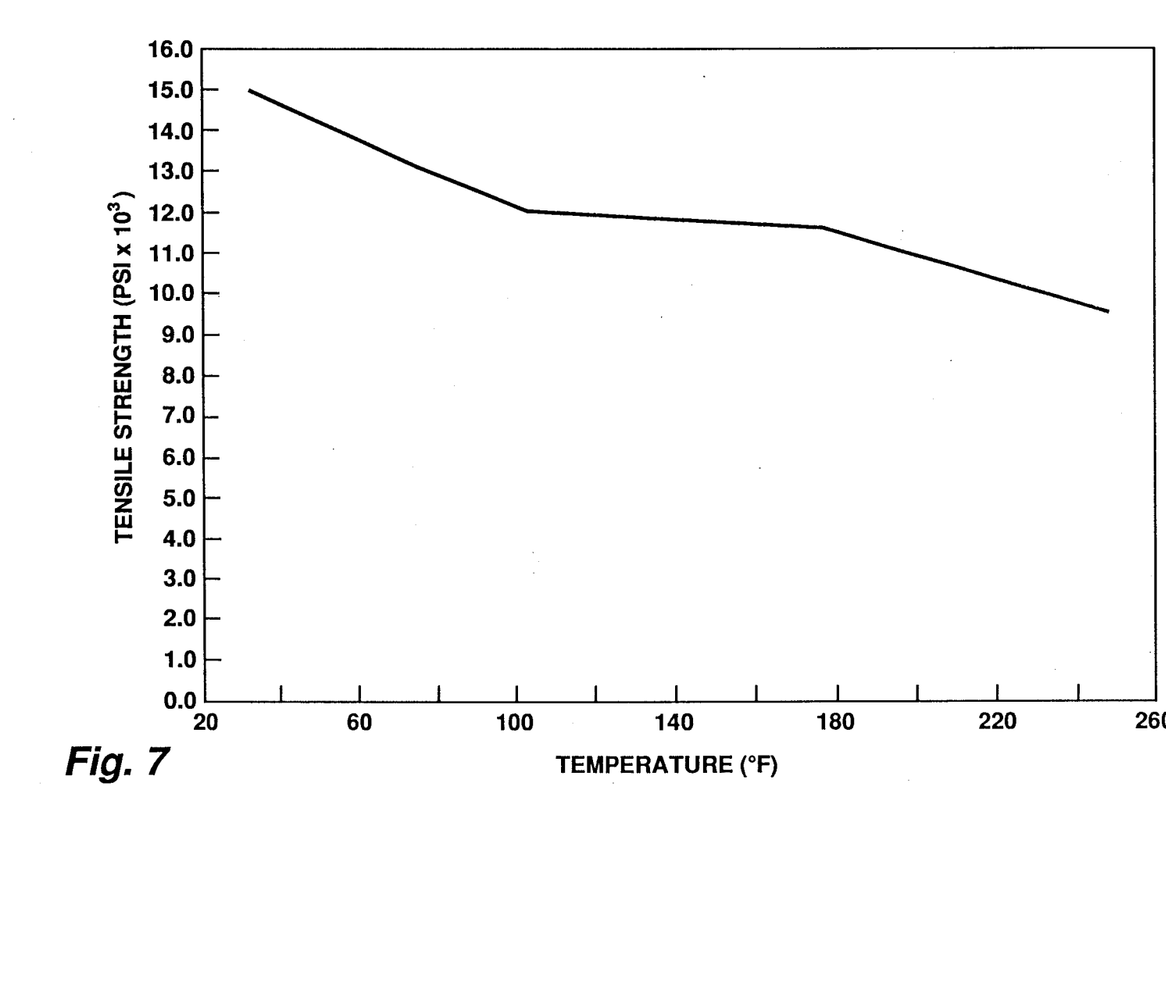
Figure 8:
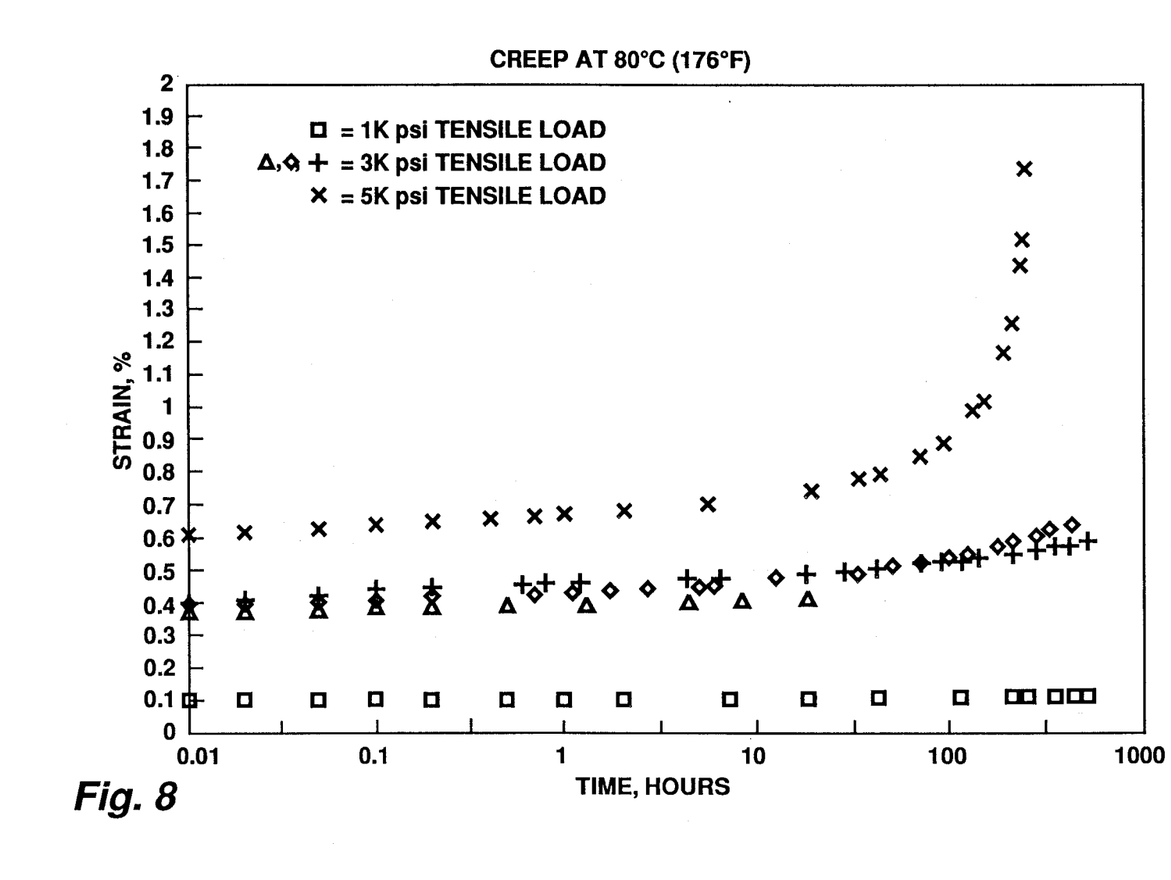

Various properties of ADZEL material containing, for example, 40% by weight, continuous filament random glass fiber mat are illustrated in FIG. 6, 7, and 8. In FIG. 6, the material has a tensile modulus of elasticity exceeding 1,000,000 psi at about 30° F. and a tensile modulus of elasticity in excess of 700,000 psi at 240° F. In FIG. 7, the material exhibits a tensile strength in excess of 10,000 psi in a temperature range of 20°-250° F. In FIG. 8, the creep of the material at an elevated temperature of 176° F. at a tensile pressure of 1,000 psi is less than 0.2% which is considered excellent for a high temperature, high pressure application at the pressures and temperatures for a commercial residential water heater. This pressure is well above what is normally expected for such a water heater.

In forming the tank 10, FIG. 1a, the end caps 14 and 16 are slowly heated in an oven until the polypropylene crystalline thermoplastic material exceeds its glass transition temperature and becomes molten. The heated sheets of material are then transferred to between two matched dies and are compression formed by compressing one die against the other which are contoured to the shape of the caps 14 and 16. The resin material forming the caps 14 and 16, being thermoplastic, may subsequently be heat welded by subjecting the material to high friction forces as known in the thermoplastic heat welding are, e.g., spin welding. The circular cylindrical tubular member 12 of the tank 10 may be formed by passing the material when it is formed through an extrusion die employing the processes that are known in the thermoplastic extrusion art. The caps 14 and 16 may be spin welded to the circular member 12 to form a fluid tight seal and mechanical joint at lap joints 26 and 28. It can be shown the joint can withstand the anticipated shear forces when the volume 30 of the tank 10 is at its operating temperature and pressure.

Tables 1a and 1b illustrate nominal tank dimensions wherein dimension d is the outside diameter of member 12, t is the wall thickness of the walls of the tank which thickness is uniform for all the members of the tank required for the desired operating pressure and temperature, $V_m$ is the interior volume 30 of the tank, and $W_m$ is the weight of 40% by weight glass fiber reinforced ADZEL material.

TABLE I(a)

| d (in.) | 15 | 16 | 17 | 18 | 19 |
|---|---|---|---|---|---|
| t (in.) | 0.225 | 0.24 | 0.255 | 0.27 | 0.285 |
| L in.) | 73 | 65 | 58.5 | 53 | 48.5 |
| $V_m$ (in.$^3$) | 774 | 785 | 798 | 812 | 829 |
| $W_m$ (lb.) | 33.5 | 34 | 34.5 | 35.3 | 36 |

TABLE I(b)

| d (in.) | 20 | 21 | 22 | 23 | 24 |
|---|---|---|---|---|---|
| t (in.) | 0.3 | 0.315 | 0.33 | 0.345 | 0.36 |
| L (in.) | 45 | 41.5 | 40 | 36.5 | 34.5 |
| $V_m$ (in.$^3$) | 846 | 866 | 888 | 912 | 938 |
| $W_m$ (lb.) | 36.7 | 37.6 | 38.5 | 29.6 | 40.7 |

From the tables, it can be observed that the overall length of the tank 10 can be kept below 6 feet employing a tank outside diameter larger than 15 inches.

The wall thickness increases with the diameter, but the overall length decreases. As the diameter increases from 15 inches to 20 inches, the overall length decreases from 6 feet to 3.75 feet. The amount of materials used increases from 33.5 lbs. to 36.7 lbs. representing about a 10% increase in material use. The wall thickness increases from 0.225 inches to 0.3 inches for the dimensions given. Employing a diameter d of about 18 inches results in a tank length of about 4 feet 5 inches and a cylindrical central member 12 length of about 3 feet. From the tables, a wall thickness of about 5/16 of an inch is adequate for most implementations. For a commercial hot water tank for general use, the operating temperature is estimated to be about 180° F. at an operating pressure of 55 psi with a test pressure of 300 psi and a tank capacity of 52 gallons. The ultimate tensile strength of the material at a typical water heater temperature of 180° F., FIG. 7, is greater than 10,000 psi.

The fittings 22 and 24, FIG. 1a, are assembled to the respective end caps 14 and 16 prior to assembly of the tank. The adhesive bonding material is applied to the fittings prior to their assembly. The adhesive material forms a hermetically sealed joint. The use of the fittings 20 and 22 is believed essential for attaching the external plumbing to the tank 10 by reason of the fact that the fittings permit a high strength coupling of the plumbing to the relatively thin walls of the thermoplastic material forming the tank 10. Normally, relatively thin plastic walls are not believed to withstand high torque and stress loads induced by a direct threaded engagement.

Due to the random orientation of the continuous filament glass fiber mat employed in the material of the present invention, there may be possible variations in macro-scale mechanical property values. For example, a test coupon of about ½ inch gauge length had a tensile modulus that has been shown to vary by a factor of 2 over the coupon length. The elastic modulus has been shown to vary by a factor of 3 over a plaque that measured 6×12 inches. The modulus variation over the plaque appeared to be random. The mean densities of the coupons varied from a minimum of 1.114 GCm$^{-3}$ to a maximum of 1.319 GCm$^{-3}$. The variability in the density mainly reflects the variation in glass distribution. Although tests show that the elastic modulus generally increases with density, test data revealed large variations and scatter of these values. The lack of strong correlation between glass content and modulus is believed to be caused by the local orientation of the fibers in the random glass fiber mat.

A simple one dimensional model, in which the elastic modulus was assumed to vary with the distance, had been used to show that the effective tensile modulus over a length is a harmonic mean of the variation over that length. That is, the mean compliance is the arithmetic mean of the compliance distribution over that length. Since the harmonic mean is smaller than the average, or arithmetic mean, the effective modulus is lower than the average modulus. The effective bending, or flexural, modulus of a rectangular beam is the inverse of a weighted harmonic mean of the variation of the beam length. This may explain the differences between measured tensile and flexural moduli of such nonhomogeneous materials.

It is known that the glass fibers forming the mat are laid at a uniform rate in some given order by a mechanism. Therefore, it is believed that there is some predetermined order to the tensile modulus variation. A model material in which the elastic modulus is modulated by a space-wise sinusoidal variation has been analyzed. The results of the analysis show that the effective tensile and bending moduli can have large differences when the gauge length of measurement is smaller than the wave length of the sinusoid. However, for gauge lengths greater than about 5 wavelengths, the tensile and flexural moduli converge to a value that corresponds to the tensile harmonic mean for one wavelength. This indicates that the material is essentially homogeneous on a scale of several wavelengths. For the stiffness design of relatively large features such as tank 10, the material can be treated as a homogeneous material with a tensile elastic modulus equal to the harmonic mean. This obviously is true only for the assumed sinusoidal variation.

However, the use of an actual random ½ inch gauge length tensile modulus coupon data to predict the effective tensile and flexural moduli of long bars appears to support this conclusion for an actual random glass mat material. It is therefore important, however, that in interpreting modulus data of the given material, care be taken due to the random variation of the values. For the above reasons, it is believed that the polypropylene reinforced random continuous glass fiber mat material has the structural properties required for a high temperature, high pressure vessel. Consequently, the relatively low cost compression forming of the structural configuration of the tank 10 by thermal compression procedures can produce a relatively cost-effective product for commercial applications.

Figure 4A:
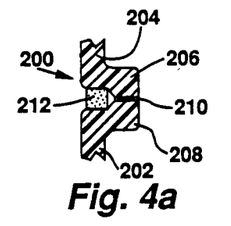
FIGS. 4a and 4b are alternate embodiments of joints for the embodiments of FIGS. 1b and 1c at the encircled areas at reference numeral 4.

FIGS. 1b, 1c, 1d and 1e illustrate alternative embodiments for a high pressure, high temperature vessel. In FIG. 1b tank 200 comprises two generally identical thermocompression formed ADZEL sheet members 202 and 204 which are mirror images of one another. In FIG. 1b the members 202 and 204 are two similar sections of an elongated circular cylindrical tube having a semispherical portions at each of the respective ends and surrounded by flanges 206 and 208, respectively. The circular cylindrical portions 205 and 207 when joined form an elongated circular cylindrical tank. Identical mirror image flanges 206 and 208 are butt joined around the entire periphery of the two halves. Joint 210 is illustrated in more detail in FIGS. 4a and 4b which are alternative structures. In FIG. 4a, flange 206 is heat-welded to flange 208 to form joint 210. In addition, a gasket 212 under compression is between the edges of the respective members 202 and 204.

Figure 4B:
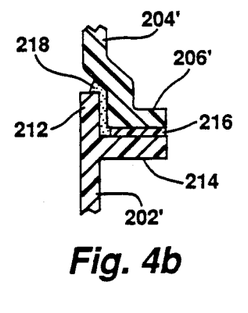

In FIG. 4b, member 204' flange 206' is offset from the plane of the member 204'. Member 202' has a flange 212 which is coextensive with the remainder of the portion 202'. An upstanding wall member 214 parallel to the flange 206' is heat-welded to flange 206' to form joint 216. A high temperature, high pressure flexible adhesive 218 is in the interface between members 204' and 202' forming a single joint with the heat weld joint 216.

In FIG. 1c, tank 300 comprises two generally mirror image members 302 and 304 having elongated circular cylindrical portion 302' is continuous and integral with a cylindrical portion 302' and 304', respective. The semispherical end portion 306. The cylindrical portion 304' is also integral and continuous with a semispherical end portion 306' which may be identical to portion 306. Fittings 308 and 310 may be attached respectively to portions 304' and 306. Fitting 308 corresponds to fitting 84, FIG. 5b, whereas fitting 310 corresponds to fitting 22, FIG. 5c.

Figure 3A:
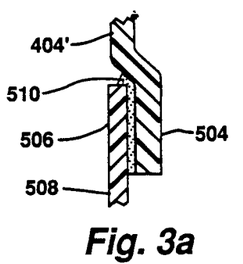
FIGS. 3a and 3b are alternate embodiments of joints for the embodiments of FIGS. 1a and 1d at the encircled areas at reference numeral 3.
Figure 3B:
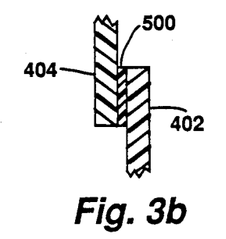

The embodiment of FIG. 1d employs two mating halves similar in shape to portions 302 and 304, FIG. 1c. The difference is that one half 400 has a smaller diameter dimensioned to closely be received within the internal diameter of portion 402 to form a lap joint region at circle 3. Portions 404 and 406 are circular cylindrical and the end portions 408 and 410 are semispherical. The joints identified by reference numeral 3 is the same joint identified by reference numeral 3 in FIG. 1a of tank 10 illustrated in alternative arrangements, FIGS. 3a and 3b. In FIG. 3b, the two members are joined at the lap joint by spin-weld forming a heat sealed joint 500 between the two members 402 and 404. In the alternative, FIG. 3a, member 404' may have a flange 504 offset from the plane of member 404'. Wall 506 of member 508 is in the offset region formed by flange 504. The two mating halves folded by members 404' and 506 may have the same internal diameter rather than different diameters as illustrated in the embodiments of FIGS. 1a and 1d. An adhesive, high temperature flexible sealant 510 may be used to seal the joint between the flange 504 and member 506.

In an additional alternative embodiment, FIG. 1e, a circular cylindrical member 600 is formed in a somewhat& clam-shell configuration having two longitudinal abutting flanges 602 and 604. The flanges are joined with a joint, circle 4, similar to that illustrated in FIGS. 4a and 4b. An end cap 604 is secured to the central member 600 at each end similar in arrangement to the caps of 14 and 16 of the embodiment of FIG. 1a. In the embodiment of FIG. 1e, the end caps 604 are secured within the interior volume of the member 600. A lap joint is between the end cap 604 and the circular cylindrical member 600.

The term heat welding as employed herein means a process wherein two thermoplastic members which tend to soften when exposed to heat are joined by vibration welding, that is by vibrating one member at the joint relative to another member at relatively high frequencies, for example, ultrasonic frequencies, hot plate welding, induction welding, or other heating processes in which the material of the joints are melted and joined to form an integral homogeneous joint. The advantages of forming the tank of the different embodiments 1a-1e depends on cost factors involved in fabrication of the ADZEL material. In any case, interchangeable fittings may be made of thermoplastic material for attachment to the various tank structures for interconnection of plumbing conduits. In the preferred embodiment, the ADZEL material may comprise 40% by weight glass fiber mat. However, the glass fibers may comprise about 30% to 50% by weight of the material in accordance with the parameters of a given implementation.

What is claimed is:

1. A high pressure, high temperature fluid vessel comprising:
   a plurality of sheets of thermoplastic members shaped to form a hollow fluid vessel, each member comprising a thermoplastic resin impregnated continuous filament randomly oriented glass fiber mat, said members being secured together at at least one joint; and
   means for sealing said at least one joint.

2. The vessel of claim 1 wherein said means for sealing includes a thermoplastic weld.

3. The vessel of claim 1 further including a thermoplastic fitting secured to one of said members adapted to couple fluid transmitting means to the interior of said hollow vessel.

4. The vessel of claim 3 wherein at least one of said members is semispherical, said fitting including a flange configured to mate with said semisphere.

5. The vessel of claim 1 wherein the vessel includes at least one convex end cap member sealingly connected to a tubular circular cylindrical member.

6. The vessel of claim 1 wherein the vessel comprises a pair of circular cylindrical tubular members each with a concave end portion, said pair of members being connected at said at least one joint in overlapping relation.

7. The vessel of claim 1 wherein the vessel comprises a pair of circular cylindrical tubular members each terminating at one end in an annular flange forming said at least one joint and enclosed at the other end by an integral concave structure.

8. The vessel of claim 1 wherein the vessel comprises a pair of like members each comprising a concave structure having first and second ends, said structure defining an elongated semicircular tubular half, each end comprising a portion of a semisphere and an annular flange extending around the periphery of said concave structure forming said at least one joint.

9. The vessel of claim 1 wherein one of said members comprises a circular cylindrical tubular structure having a longitudinal axis, said structure having first and second mating flanges extending along said axis and forming one of said joints.

10. The vessel of claim 1 wherein said glass fiber ma&: comprises about 40% of the weight of the members.

11. The vessel of claim 1 wherein said thermoplastic material is polypropylene.

12. The vessel of claim 1 wherein a wall of one of said members has an aperture therein, said aperture being defined by an annular edge in said wall, said edge a circular rib extending from the edge integral and homogeneous with that wall, said rib defining an annular cylinder extending in a direction generally transverse said wall.

13. A high pressure, high temperature fluid vessel comprising:
   a pair of like compression formed thermoplastic members each comprising a semispherical shaped thermoplastic resin impregnated randomly oriented continuous filament glass fiber mat; and
   means for coupling the members to form a fluid tight circular cylindrical chamber.

14. The vessel of claim 13 wherein said means for coupling includes a circular cylindrical tubular member comprising a thermoplastic resin impregnated randomly oriented continuous filament glass fiber mat joined to said pair of members at sealed joints.

15. The vessel of claim 13 wherein said members each have a tensile modulus of elasticity of at least $0.5 \times 10^6$ psi in a temperature range of at least about 20° F. to 250° F.

16. The vessel of claim 13 wherein said members each have a tensile strength of at least $7 \times 10^3$ psi in a temperature range of at least about 20° F. to 250° F.

17. A high pressure, high temperature fluid vessel comprising:
   a first sheet of compression formed thermoplastic resin impregnated continuous filament randomly oriented glass fiber mat, said first sheet comprising one segment of said vessel;
   a second sheet of compression formed thermoplastic resin impregnated continuous filament randomly oriented glass fiber mat, said second sheet comprising a second segment of said vessel; and
   means for sealingly coupling the first sheet to the second sheet to form a hollow vessel for receiving a fluid substantially above ambient atmosphere pressure and substantially above ambient atmosphere temperature.

18. The vessel of 17 claim the glass fibers comprise about 30%-59% of the weight of the material forming said sheets.

19. The vessel of claim 17 including a thermoplastic fitting secured to one of said sheets adapted to couple fluid to said vessel.

* * * * *